United States Patent [19]

Neumann et al.

[11] Patent Number: 5,981,664
[45] Date of Patent: Nov. 9, 1999

[54] LOW-SHRINKAGE POLYETHYLENE MOULDING COMPOUNDS

[75] Inventors: Petra Neumann, Böhl-Iggelheim; Siegfried Weber, Weinheim; Dieter Lilge, Limburgerhof; Hans-Helmut Görtz, Freinsheim, all of Germany

[73] Assignee: BASF Aktiengesellschaft, Ludwigshafen, Germany

[21] Appl. No.: 08/981,048

[22] PCT Filed: Jul. 5, 1996

[86] PCT No.: PCT/EP96/02958

§ 371 Date: Dec. 11, 1997

§ 102(e) Date: Dec. 11, 1997

[87] PCT Pub. No.: WO97/04025

PCT Pub. Date: Feb. 6, 1997

[30] Foreign Application Priority Data

Jul. 19, 1995 [DE] Germany .......................... 195 26 340

[51] Int. Cl.⁶ .................................................. C08L 23/04
[52] U.S. Cl. ........................ 525/240; 215/329; 526/348; 526/352
[58] Field of Search ........................ 525/240; 526/348, 526/352; 215/329

[56] References Cited

U.S. PATENT DOCUMENTS 4,461,873  7/1984  Bailey et al. .......................... 525/240
4,937,299  6/1990  Ewen et al. ............................. 525/240
5,110,685  5/1992  Cross et al. ............................ 525/240
5,284,613  2/1994  Ali et al. ................................ 525/240

*Primary Examiner*—Donald R. Wilson
*Attorney, Agent, or Firm*—Keil & Weinkauf

[57] ABSTRACT

Molding compositions are based on polymers of ethylene made from (A) from 40 to 65% by weight of an ethylene polymer having a density in the range from 0.948 to 0.964 g/cm³, a melt flow index (MFI) of from 6 to 20 g/10 min and a mean molar mass distribution $\bar{M}_w/\bar{M}_n$ in the range from 2 to 5, (B) from 35 to 60% by weight of an ethylene polymer having a density in the range from 0.935 to 0.953 g/cm³, a melt flow index (MFI) of from 0.1 to 0.35 g/10 min and a mean molar mass distribution $\bar{M}_w/\bar{M}_n$ in the range from 6 to 20, and (C) from 0 to 6% by weight of the usual additives for thermoplastics, where the density of the molding compositions is in the range from 0.948 to 0.957 g/cm³, the melt flow index is in the range from 1.0 to 2.0 g/10 min, the mean molar mass distribution $\bar{M}_w/\bar{M}_n$ is in the range from 3 to 10 and the difference of the densities of components A and B ($\Delta D = D_{(A)} - D_{(B)}$) is in the range from 0 to 0.029 g/cm³.

10 Claims, No Drawings

LOW-SHRINKAGE POLYETHYLENE MOULDING COMPOUNDS

The present invention relates to molding compositions based on polymers of ethylene made from (A) from 40 to 65% by weight of an ethylene polymer having a density in the range from 0.948 to 0.964 g/cm$^3$, a melt flow index (MFI) of from 6 to 20 g/10 min and a mean molar mass distribution $\overline{M}_w/\overline{M}_n$ in the range from 2 to 5, (B) from 35 to 60% by weight of an ethylene polymer having a density in the range from 0.935 to 0.953 g/cm$^3$, a melt flow index (MFI) of from 0.1 to 0.35 g/10 min and a mean molar mass distribution $\overline{M}_w/\overline{M}_n$ in the range from 6 to 20, and (C) from 0 to 6% by weight of the usual additives for thermoplastics, where the density of the molding compositions is in the range from 0.948 to 0.957 g/cm$^3$, the melt flow index is in the range from 1.0 to 2.0 g/10 min, the mean molar mass distribution $\overline{M}_w/\overline{M}_n$ is in the range from 3 to 10 and the difference of the densities of components A and B ($\Delta D = D_{(A)} - D_{(B)}$) is in the range from 0 to 0.029 g/cm$^3$.

The present invention also relates to a process for preparing these molding compositions by melt extrusion, the use of the molding compositions for producing films, fibers and shaped articles, to films, fibers and shaped articles made from these molding compositions and to screw closures made from the molding compositions.

Mixtures based on ethylene polymers, termed polyethylene blends below, are known and are used, for example, for producing shaped articles which are resistant to stress cracking, as described in DE-C 34 37 116.

In more recent times, polyethylene blends have been used in injection molding to produce many types of screw closure. It is advantageous if, after the injection molding procedure, i.e. during cooling, the screw closures retain their dimensions and shape, i.e. do not shrink (low shrinkage). It generally leads to easier injection molding if the polyethylene molding compositions have good flowability in the melt. Low shrinkage coupled with retention of shape represents an important property of plastics which are to be used, for example, to produce screw closures with accurate fit.

The known molding compositions are not fully satisfactory with respect to the combined properties of dimensional stability and retention of shape (shrinkage behavior) on the one hand and good flowability on the other hand.

It is an object of the present invention to overcome these shortcomings and to provide, in particular, polyethylene molding compositions which have both good flowability and good dimensional stability and retention of shape (low shrinkage).

We have found that this object is achieved by means of the molding compositions defined at the outset, a process for their preparation, their use for producing films, fibers and shaped articles, by films, fibers and shaped articles made from these molding compositions, and by screw closures made from these molding compositions.

The novel molding compositions contain, as component (A), from 40 to 65% by weight, preferably from 55 to 60% by weight, based on the ethylene polymers, of an ethylene polymer whose density measured according to DIN 53 479 is from 0.948 to 0.964 g/cm$^3$, preferably from 0.959 to 0.964 g/cm$^3$, whose melt flow index, measured according to DIN 53 735 at 190° C. and 2.16 kg load, is from 6 to 20 g/10 min, preferably from 6 to 10 g/10 min, and whose mean molar mass distribution $\overline{M}_w/\overline{M}n$, measured by the GPC method at 135° C. in 1,2,4-trichlorobenzene (polyethylene standard), is in the range from 2 to 5, in particular from 3 to 4.

Component (A) is usually obtained by polymerizing ethylene or by copolymerizing ethylene with $C_3$–$C_{12}$-alk-1-enes in the presence of Ziegler catalysts known to the person skilled in the art, for example from DE-A 34 33 468, especially Example 1. The ethylene-alk-1-ene copolymers contain up to 1% by weight, preferably up to 0.5% by weight, of structural units derived from the alk-1-ene. It is preferable to use one or more comonomers selected from the class consisting of the $C_3$–$C_8$-alk-1-enes, such as propene, 1-butene, 1-pentene, 1-hexene and 1-octene.

The novel molding compositions contain, as component (B), from 35 to 60% by weight, preferably from 40 to 45% by weight, based on the ethylene polymers, of an ethylene polymer whose density, measured according to DIN 53 479, is from 0.935 to 0.953 g/cm$^3$, preferably from 0.935 to 0.941 g/cm$^3$, whose melt flow index, measured according to DIN 53 735 at 190° C. and 2.16 kg load, is from 0.1 to 0.35 g/10 min, preferably from 0.1 to 0.2 g/10 min, and whose mean molar mass distribution $\overline{M}_w/\overline{M}_n$, measured by the GPC method at 135° C. in 1,2,4-trichlorobenzene (polyethylene standard), is in the range from 6 to 20, in particular from 8 to 15.

Component (B) is generally obtained by polymerizing ethylene or by copolymerizing ethylene with $C_3$–$C_{12}$-alk-1-enes in the presence of Phillips catalysts known to the person skilled in the art, for example from DE-A 25 40 279.

The ethylene-alk-1-ene copolymers used as component (B) contain from 0.5 to 3% by weight, preferably from 0.5 to 2% by weight, of structural units derived from the alk-1-ene. It is preferable to use one or more comonomers selected from the class consisting of the $C_3$–$C_8$-alk-1-enes such as propene, 1-butene, 1-pentene, 1-hexene and 1-octene.

The novel molding compositions may moreover contain from 0 to 6% by weight, preferably from 0.1 to 1% by weight, based on the weight of the ethylene polymers, of the usual additives for thermoplastics. For the purposes of the invention these are, inter alia, lubricants (Ca stearate); conventional stabilizers, such as phenols, phosphites, benzophenone, benzotriazoles or thioethers; fillers, such as $TiO_2$, chalk or carbon black, and conventional pigments, such as $TiO_2$ and ultramarine blue.

The density of the novel molding compositions, measured according to DIN 53 479, is in the range from 0.948 to 0.957 g/cm$^3$, preferably from 0.948 to 0.954 g/cm$^3$.

The melt flow index of the novel molding compositions, measured according to DIN 53 735 at 190° C. and 2.16 kg load, is in the range from 1.0 to 2.0 g/10 min.

The mean molar mass distribution $\overline{M}_w/\overline{M}_n$ of the novel molding compositions, determined by gel permeation chromatography (GPC) in 1,2,4-trichlorobenzene at 135° C. against a polyethylene standard, is in the range from 3 to 10, preferably from 4 to 8.

The difference of the densities ($\Delta D$) of components (A) and (B) ($\Delta D = D_{(A)} - D_{(B)}$) used for producing the novel molding compositions is in the range from 0 to 0.029 g/cm$^3$, preferably in the range from 0 to 0.024 g/cm$^3$.

The novel molding compositions are prepared from the constituents (A), (B) and, if used, (C), by mixing the constituents using the processes usual in plastics technology, such as melt extrusion, milling, compaction or mixing in solution. It is preferable to use melt extrusion, for example in a twin-screw extruder. The extrusion temperatures are generally in the range from 140 to 250° C.

The sequence of addition of the components is generally not significant. It is therefore possible to add all of the components (A), (B) and, if used, (C), in premixed form into the means of mixing, or to add them separately, or two components may be premixed and the third, if used, added separately into the means of mixing.

The flow properties of the novel polyethylene molding compositions were determined using the injection molding test (spiral flow test). For this, measurement is made of the degree to which the appropriate ethylene polymers fill an injection mold constructed in the form of a spiral. (Test specifications 10 and 10.1, BASF AG: processing temperature 270° C., cycle time 30 s, spiral length in cm).

The dimensional stability and retention of shape of the novel polyethylene molding compositions was measured by a method similar to BASF test method No. 12. For this, plastic closures were produced in an injection molding machine using a threaded mold (thread diameter 28.2 mm) at from 180 to 270° C. and allowed to cool; the external diameter of the thread of 50 test specimens was then measured, the mean in mm calculated, the variance from the diameter of the threaded mold determined, and the test specimens evaluated visually for dimensional stability and retention of shape.

The novel polyethylene molding compositions have both good flow properties (spiral length greater than 20 cm) and good dimensional stability and retention of shape (low shrinkage). They are particularly advantageous for further processing to give screw closures, for example for drinks bottles.

Examples 1 to 5

Polymer blends were prepared from the ethylene polymers which are specified below, (A) (ethylene homopolymer) and (B) (ethylene/1-hexene copolymer, 1-hexene content 2.5% by weight) with 0.3% by weight of Ca stearate and Irganox® 1076, based on the weight of the ethylene polymers, as stabilizer, using a twin-screw extruder (Werner & Pfleiderer ZSK 53) under the following extrusion conditions; their properties were determined (see Table 1) and they were injection molded to give closures.

Extrusion conditions:

Throughput of polymer: 50 kg/h
Rotation rate: 120/min
Melt temperature: 200° C.

Ethylene homopolymer (A):

Catalyst: Ziegler
  (DE-A 34 33 468, Example 1)
MFI [g/10 min] (190° C./2.16 kg): 8.2
Density [g/cm³]: 0.9615
$\overline{M}_w$ 1): 80,000
$\overline{M}_w/\overline{M}_n$ 1): 4
Ethylene/1-hexene copolymer (B):
Catalyst: Phillips
  (DE-A 25 40 279, Example)
MFI [g/10 min] (190° C./2.16 kg): 0.15
Density [g/cm³]: 0.9372
$\overline{M}_w$ 1): 200,000
$\overline{M}_w/\overline{M}_n$ 1): 9

1) determined using gel permeation chromatography (1,2,4-trichlorobenzene, 135° C., PE standard)

TABLE 1

Polyethylene molding compositions made from components (A) and (B) and their properties

|  | Mixture 1 | Mixture 2 | Mixture 3 | Mixture 4 | Mixture 5 |
|---|---|---|---|---|---|
| Example |  |  |  |  |  |
| Ratio[1] (B):(A) | 40/60 | 42.5/57.5 | 45/55 | 47.5/52.5 | 50/50 |
| MFI (g/10) (190° C./2.16 kg) | 1.79 | 1.56 | 1.52 | 1.37 | 1.23 |
| Density (g/cm³) | 0.9520 | 0.9515 | 0.9518 | 0.9512 | 0.9502 |
| Spiral length, 270° C. (cm) | 28.9 | 29.1 | 28.8 | 28.6 | 29.7 |
| Thread diameter (mm) mean value: | 28.19 | 28.20 | 28.24 | 28.18 | 28.25 |
| min | 28.18 | 28.19 | 28.23 | 28.18 | 28.23 |
| max | 28.20 | 28.23 | 28.25 | 28.19 | 28.26 |
| $\overline{M}_w$ | — | 139 | — | — | 141 |
| $\overline{M}_n$ | — | 25 | — | — | 21 |
| $\overline{M}_w/\overline{M}_n$ |  | 6 |  |  | 7 |

[1] In % by weight, based on the ethylene polymers

We claim:

1. A molding composition based on polymers of ethylene made from
   (A) from 40 to 65% by weight of an ethylene polymer having a density in the range from 0.948 to 0.964 g/cm³, a melt flow index (MFI) of from 6 to 20 g/10 min and a mean molar mass distribution $\overline{M}_w/\overline{M}_n$ in the range from 2 to 5,
   (B) from 35 to 60% by weight of an ethylene polymer having a density in the range from 0.935 to 0.953 g/cm³, a melt flow index (MFI) of from 0.1 to 0.35 g/10 min and a mean molar mass distribution $\overline{M}_w/\overline{M}_n$ in the range from 6 to 20, and
   (C) from 0 to 6% by weight of the usual additives for thermoplastics, selected from the group consisting of lubricants, stabilizers, fillers and pigments,
where the density of the molding compositions is in the range from 0.948 to 0.957 g/cm³, the melt flow index is in the range from 1.0 to 2.0 g/10 min, the mean molar mass distribution $\overline{M}_w/\overline{M}_n$ is in the range from 3 to 10 and the difference of the densities of components A and B ($\Delta D = D_{(A)} - D_{(B)}$) is in the range from 0 to 0.029 g/cm³.

2. A molding composition as claimed in claim 1, in which component (A) is present in a proportion of from 55 to 60% by weight and component (B) is present in a proportion of from 40 to 45% by weight.

3. A molding composition as claimed in claim 1, where the density of component (A) is in the range from 0.959 to 0.964 g/cm³ and the density of component (B) is in the range from 0.935 to 0.941 g/cm³.

4. A molding composition as claimed in claim 1, where the melt flow index of component (A) is in the range from 6 to 10 g/10 min and the melt flow index of component (B) is in the range from 0.1 to 0.2 g/10 min.

5. A molding composition as claimed in claim 1, where component (A) is an ethylene-alk-1-ene copolymer with a content of up to 1% by weight of chemically bonded alk-1-ene units and component (B) is an ethylene-alk-1-ene copolymer having a content in the range from 0.5 to 3% by weight of chemically bonded alk-1-ene units and the alk-1-ene is a $C_3$–$C_{12}$-alk-1-ene.

6. A process for producing molding compositions based on polymers of ethylene as claimed in claim 1 by melt extrusion in the presence of from 0 to 6% by weight of the usual additives for thermoplastics, wherein component (A)

is prepared using a Ziegler catalyst and component (B) is prepared using a Phillips catalyst.

7. A process for producing fibers, films and shaped articles by melt extrusion of the molding composition as claimed in claim 1.

8. A process for producing screw enclosures by melt extrusion of the molding composition as claimed in claim 1.

9. A film, a fiber or a shaped article made from a molding composition as claimed in claim 1.

10. A screw closure made from a molding composition as claimed in claim 1.

* * * * *